United States Patent [19]

Tsubouchi et al.

[11] Patent Number: 4,479,915

[45] Date of Patent: Oct. 30, 1984

[54] FLOAT STOPPER ATTACHING METHOD IN LIQUID LEVEL SENSOR

[75] Inventors: Kaoru Tsubouchi; Akira Funahashi, both of Toyota, Japan

[73] Assignee: Aisin Seiki Kabushiki Kaisha, Japan

[21] Appl. No.: 352,994

[22] Filed: Feb. 26, 1982

[30] Foreign Application Priority Data

Mar. 5, 1981 [JP] Japan .................................. 56-31780

[51] Int. Cl.$^3$ ...................... B29C 17/00; B29C 27/00; B29F 5/00
[52] U.S. Cl. ...................................... 264/249; 29/512; 29/522 R; 264/292; 264/320; 403/261; 403/274
[58] Field of Search ............... 264/249, 320, 292, 322; 29/509, 512, 522 R, 507, 523; 403/261, 274

[56] References Cited

U.S. PATENT DOCUMENTS

| | | | |
|---|---|---|---|
| 2,318,950 | 5/1943 | Larmour | 29/509 R |
| 4,037,193 | 7/1977 | Uemura | 340/623 |
| 4,177,545 | 12/1979 | Lambertz | 29/522 A |
| 4,340,560 | 7/1982 | Migeon | 29/512 |

FOREIGN PATENT DOCUMENTS

| | | | |
|---|---|---|---|
| 565704 | 3/1958 | Belgium | 264/249 |
| 1009617 | 11/1965 | United Kingdom . | |
| 1210948 | 11/1970 | United Kingdom . | |

*Primary Examiner*—Willard E. Hoag
*Attorney, Agent, or Firm*—Finnegan Henderson Farabow Garrett & Dunner

[57] ABSTRACT

A float stopper is attached to the free end of a thermoplastic switch case constituting part of a liquid level sensor by forming the free end of the switch case into a hollow, cylindrically shaped projection, fitting the float stopper over the projection through a hole formed in the stopper and, forcibly inserting a caulking tool, heated to a temperature which is lower than the melting point of the thermoplastic material constituting the switch case, into the cylindrically shaped projection to soften and spread the projection until its outer surface abuts against the rim of the hole formed in the float stopper. Upon curing the spread portion of the caulking projection holds the float stopper rigidly in place with excellent mechanical strength.

2 Claims, 6 Drawing Figures

FLOAT STOPPER ATTACHING METHOD IN LIQUID LEVEL SENSOR

BACKGROUND OF THE INVENTION

1. Field of the Invention

This invention relates to a method of attaching a float stopper in a liquid level sensor. The liquid level sensor to which the present invention appertains is of the type which comprises a switch case made of a thermoplastic synthetic resin and so disposed in a tank as to extend in the vertical direction, a switch, actuated by a magnetic force, disposed within the switch case, a float so fit on the outside of the switch case as to be freely slidable in the vertical direction, a permanent magnet attached to the float, and the float stopper which is attached to the free end of the switch case for limiting the upward or downward stroke of the float.

2. Description of the Prior Art

According to the conventional method of attaching the float stopper, the float stopper is attached to the free end of the thermoplastic switch case by fitting the float stopper, provided beforehand with a central hole, over the outside of a solid, column-shaped caulking projection formed on the free end of the switch case, and applying a high temperature to the tip of the caulking projection by means of a heated caulking tool to melt its surface into a mass which overflows onto the float stopper to form a portion which, upon hardening, locks the float stopper securely in place. With the conventional method, however, the hardened locking portion extending from the caulking projection to the float stopper has poor mechanical strength owing to carbonization and entrapped air bubbles, both of which are the result of melting the projection at high temperature. When the vertically slidable float impacts against the stationary locking portion, therefore, the latter has a tendency to break off of the switch case, permitting the float to drop off the switch case so that the performance of the sensor is impaired.

BRIEF SUMMARY OF THE INVENTION

Accordingly, an object of the present invention is to provide a method of attaching a float stopper in a fluid level sensor with sufficient mechanical strength to prevent the stopper from falling off due to breakage of the locking portion with impact.

According to the present invention, the foregoing object is attained by providing a method of attaching a float stopper in a liquid level sensor, which includes forming the caulking projection located at the free end of the switch case into a hollow cylinder, fitting the float stopper over the outside of the caulking projection, heating a caulking tool to a temperature which is lower than the melting point of the material constituting the switch case, and pressing the heated tool into the end portion of the caulking projection to spread the extremity of the caulking projection radially outwardly. Upon curing, the spread extremity holds the float stopper in place at the free end of the switch case.

BRIEF DESCRIPTION OF THE DRAWINGS

The shortcomings of the conventional method of attaching a float stopper in a liquid level sensor, the general configuration of the liquid level sensor itself, and the features and advantages of the float stopper attaching method of the present invention will be more clearly understood from the following description taken in conjunction with the accompanying drawings in which like reference characters designate the same or similar parts throughout the figures thereof, and in which.

FURTHER DESCRIPTION OF THE PRIOR ART

Figure 1:
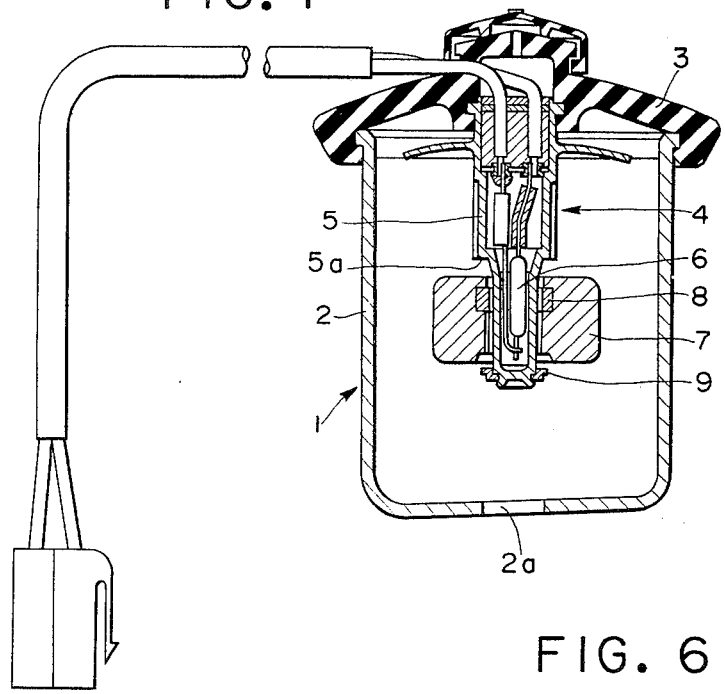
FIG. 1 is an illustrative view showing a representative example of a liquid level sensor of the nature to which the present invention appertains.

In the detailed description to follow, an example of a liquid level sensor to which the present invention appertains is illustrated in FIG. 1. A reservoir 1, which in this case is assumed to be provided for the brake cylinder of an automotive vehicle, includes a tank 2 having an opening 2a in the bottom portion thereof, and a rubber cap 3 which fits detachably over the open upper end of the tank 2. Provided within the reservoir 1 is a liquid level sensor 4 which is operative to sense when the level of a brake fluid within the reservoir 1 has fallen to a predetermined height, indicating that replenishment of the brake fluid is required. The liquid level sensor 4 comprises a switch case 5, which consists of a thermoplastic synthetic resin, such as 6-nylon or polypropylene, and which is connected at its upper end to the rubber cap 3, the lower end thereof being free, a switch 6, which is generally a reed switch, disposed within the switch case 5 and actuated by magnetic force, a float 7 fit on the outside of the switch case 5 so as to be freely slidable up and down along the switch case 5, a permanent magnet 8 attached to the float 7, and a float stopper 9 attached to the lower or free end of the switch case 5 in order to limit the downward stroke of the float 7 in this example. The switch case 5 has a stepped portion 5a for limiting the upward stroke of the float. The design is such that the stepped portion 5a is provided at a height which is a suitable distance below the maximum level of the brake fluid, but not to such an extent as will cause actuation of the switch 6 when the float 7 is in abutting contact with the stepped portion.

In operation, the float 7 is at the upper end of its stroke, abutting against the stepped portion 5a of the switch case 5, when the reservoir 1 is filled with the brake fluid. As the fluid level drops with the consumption of the fluid, however, the float 7, and hence the permanent magnet 8 attached thereto, will eventually slide downwardly along the switch case at it follows the descending fluid level. When the level reaches the predetermined height, the permanent magnet 8 actuates the switch 6 which responds by issuing an electric signal. The end of the downward stroke of the float 7 is decided by the float stopper 9 in such a manner that the permanent magnet 8 holds the switch 6 in the actuated state. The switch 6 will therefore continue to produce the electrical signal regardless of how far the fluid level drops below the predetermined height.

In the arrangement exemplified by FIG. 1, the switch case 5 and cap 3 are discrete members which are connected together. In an alternative arrangement the cap may be formed of a synthetic resin and molded into a unitary body along with the switch case. In still another arrangement the switch case may project upwardly into the tank from its bottom portion, in which case the float stopper is so arranged as to restrict the upward stroke of the float, contrary to the example of FIG. 1.

In the liquid level sensor of the type described, the float stopper 7 is conventionally attached to the free end of the switch case 5 through a well-known method which will now be described with reference to FIG. 2. The first step is forming a solid columnar projection 5b for caulking purposes on the end face at the free end of the switch case 5. Next, the float stopper 9, which has been provided with a hole of sufficient diameter at its center, is fit over the outside of the caulking projection 5b. The end portion of the caulking projection 5b is then caulked by means of a high-temperature caulking process to melt down the projection 5b into a locking portion 5c that locks or retains the float stopper firmly in place. According to the high-temperature caulking process, a caulking tool is heated to a temperature which is above the melting point of the synthetic resin that constitutes the switch case 5. The heated tool is then pressed against the tip of the caulking projection 5b, causing continuous melting of the surface layer until the tip of the projection 5b swells outwardly to form the locking portion 5c which, upon hardening, will hold the float stopper in place. In order to prevent the melted synthetic resin from attaching itself to the caulking tool, it is conventional practice to heat the tool to a temperature which is higher than the decomposition temperature of the synthetic resin.

With the foregoing conventional method of attaching the float stopper, however, only the surface layer at the tip of the caulking projection 5b is melted when the caulking operation is carried out. Consequently, the locking portion 5c extending from the caulking projecting 5b to the underside of the float stopper 7, particularly at the portion where it is connected to the projections 5b, has but a small thickness and entrains air bubbles that are produced when the water content of the synthetic resin is converted into steam by heating at said high temperature, the air bubbles being trapped within the molten resin as it hardens. Moreover, portions of the melted locking portion 5c are carbonized owing to the application of the high temperature. The net result is a reduction in the impact strength.

Figure 3:
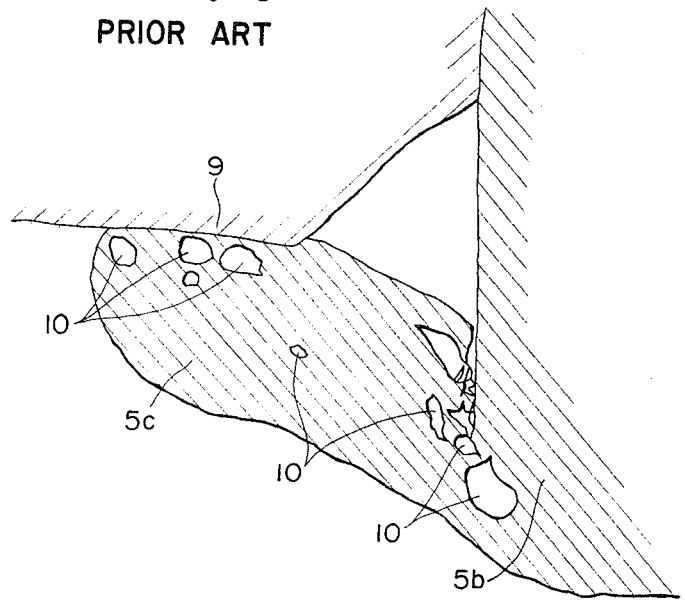
FIG. 3 is an enlarged view of section A shown in FIG. 2.

The foregoing can be appreciated from FIG. 3, which shows how air bubbles 10 collect in the locking portion 5c, especially at the area where it connects with the caulking projection 5b. It may be understood that the mechanical strength of the connection between the projection 5b and the locking portion 5c is quite poor owing to such an accumulation of air bubbles. Accordingly, when the reservoir 1 is subjected to externally applied vibration, as occurs when a vehicle travels along a road, the float 7 bounces up and down impacting against the float stopper 9 and may cause the locking portion 5c to break off from the caulking projection 5b. In the event of such mishap the float stopper 9 will fall off the switch case 5, followed by the float 7 when the break fluid reaches a low level.

DESCRIPTION OF THE PREFERRED EMBODIMENT

The present invention proposes to prevent the float stopper from falling off the switch case due to impact with the float, by subjecting the caulking projection to a caulking treatment that does not melt the projection and consequently form a structurally weakened locking portion.

Figure 4:
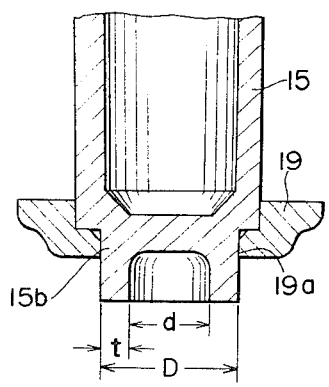
FIG. 4 is a sectional view useful in describing conditions immediately prior to a caulking operation in an embodiment of the present invention.
Figures 5, 6:
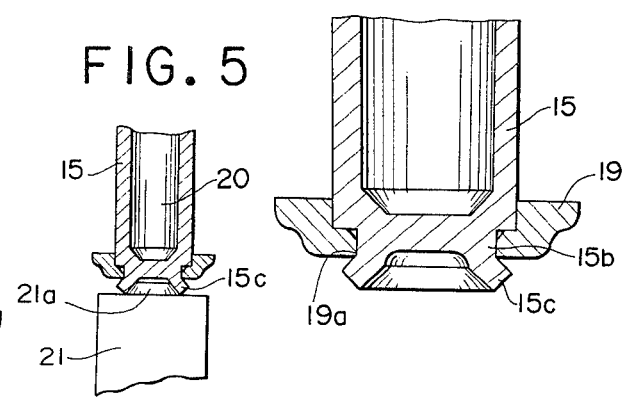
FIG. 5 is a side view useful in describing a caulking operation in an embodiment of the present invention.
FIG. 6 is a sectional view showing conditions following the caulking operation.

FIG. 4 shows the layout immediately prior to the caulking operation performed in accordance with the method of the present invention. First, a switch case 15, which consists of 6-nylon, has a caulking projection 15b formed on the end face at the free end of the switch case 15. According to the present invention, the caulking projection 15b has the shape of a hollow cylinder. Next, a float stopper 19 is provided with a central hole and is then fit over the outside of the caulking projection 15b until the tip of the projection emerges a suitable distance from the hole. In this case the rim 19a at the mouth of the central hole in the float stopper defines a corner portion having an angle of 90° or not more than 90° with respect to the bottom surface of the stopper 19. The subsequent caulking operation is performed in the manner illustrated in FIG. 5. A jig 21, which is heated to a temperature lower than the melting point of the 6-nylon constituting the switch case 15, includes a truncated conical portion 21a. In actual practice the operation shown in FIG. 5 takes place such that jig 21 is moving downwardly and jig 20 restrains the downward movement of switch case 15. With the downward motion of the switch case 15 being restricted by a jig 20 positioned within the switch case, the heated truncated conical portion 21a of the jig 21 is pressed into the opening defined by the emerging tip of the cylindrical caulking projection 15b, so that the extremity 15c of the caulking projection 15 is spread radially outwardly until the outer peripheral surface of the extremity 15c comes into abutting pressured contact with the rim 19a defining the corner portion of the float stopper 19, as depicted in FIG. 6. The reason the caulking jig 21 is heated is to remove internal stress from the spread portion 15c of the caulking projection 15b, thereby preventing its plastic restoration following retraction of the jig 21. The jig 21 is heated to a preferred temperature of from 120° to 220° C., in view of the melting point of the 6-nylon, which ranges from 220° to 230° C. According to experiments, the optimum heating temperature was found to be from 140° to 150° C.

The following table shows the results of impact strength tests performed by varying the caulking jig pressing weight W and the pressing time T for test pieces whose inner and outer diameters d, D and thickness t, shown in FIG. 4, were 3.0 mm, 5.0 mm and 1.0 mm, respectively.

| Test Piece No. | W (kg/cm$^2$) | T (sec.) | Impact Strength (kg,cm) |
|---|---|---|---|
| 1 | 136.0 | 1.60 | 10.4 |
| 2 | 117.0 | 1.70 | 12.2 |
| 3 | 72.0 | 2.75 | 12.9 |
| 4 | 58.0 | 2.40 | 12.2 |

Figure 2:
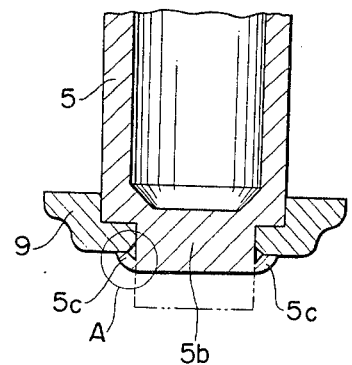
FIG. 2 is a sectional view useful in describing how a float stopper is attached to a switch case of the sensor according to the method of the prior art.

The above table shows an impact strength of no less than 10 kg. cm for each test piece, a marked improvement over impact strengths of 2.0 to 3.0 kg. cm. obtained with the conventional method as illustrated in FIGS. 2 and 3.

In the preferred embodiment described above, 6-nylon was the material adopted for the switch case 15. When polypropylene is used, it is preferred that the jig 21 be heated to a temperature of from 100° to 140° C.

In accordance with the method of the present invention, the cylindrically shaped caulking projection 15b is softened but not melted by contact with the heated caulking tool 21. Applying a suitable amount of pressure to the caulking projection during the caulking step therefore makes it possible to provide a desired thickness to the portion that connects the extremity 15c, which has been flared outwardly by contact with the caulking tool, with the portion of the caulking projection that has not been deformed. Moreover, since the caulking tool 21 is heated well below the decomposition temperature of the caulking projection 15b, neither carbonization nor the formation of air bubbles takes place within the flared extremity 15c. This assures that the strength of the connection between this portion and the non-deformed portion of the caulking projection will be enough to withstand repeated impact between the float 7 and the float stopper 19.

Furthermore, since the spread or flared portion of the caulking projection comes into pressured contact with the rim 19a of hole, formed in the float stopper 19, owing to the forcible insertion of the heated caulking tool 21, the rim 19a, which preferably defines an acute angle when viewed in section, bites into the outer periphery of the flared portion. Consequently, though the flared portion of the caulking projection may relax or sag somewhat following the caulking operation, the abutting contact between the outer periphery of the flared portion and the rim 19a in the float stopper will be maintained owing to the resiliency of the synthetic resin. This reliably prevents excessive looseness between the float stopper and the switch case.

As many apparently widely different embodiments of the present invention can be made without departing form the spirit and scope thereof, it is to be understood that the invention is not limited to the specific embodiments thereof except as defined in the appended claims.

What we claim is:

1. A method of attaching a float stopper in a liquid level sensor of the type which comprises a switch case made of a thermoplastic resin, so disposed in a tank as to extend in the vertical direction, with one end thereof being fixed and the other end free, a switch, actuated by a magnetic force, disposed within said switch case, a float fitted over the outside of said switch case so as to be freely slidable in the vertical direction, a permanent magnet attached to said float, and the float stopper attached to the free end of said switch case for limiting the vertical stroke of said float at said free end of the switch case, which method comprises the steps of:

forming the free end of the switch case into a hollow, cylindrically shaped caulking projection;

forming a hole in the center of the float stopper to such a diameter as permits the float stopper to be fitted over the outer periphery of the caulking projection and so that the rim of the central hole forms an angle of about 90° with the bottom surface of the hole stopper;

fitting the float stopper over the outer periphery of the caulking projection, the tip of the caulking projection passing through and emerging from the hole;

heating a caulking tool to a temperature which is lower than the melting point of the thermoplastic resin constituting the switch case, a portion of said heated caulking tool having the shape of a truncated cone;

forcibly inserting said portion of the heated caulking tool into the emerging tip of the hollow, cylindrically shaped caulking projection to heat said caulking projection to a temperature which is lower than the melting point of the thermoplastic resin; and spreading the heated tip of the caulking projection by means of the caulking tool until the outer peripheral surface of the caulking projection comes into abutting pressured contact with the rim of the hole formed in the float stopper and the extremity of the caulking projection is caulked into the truncated cone shape.

2. The method of attaching a float stopper according to claim 1 comprising the additional step of positioning a jig within said switch case to restrict movement thereof, this step occurring prior to the heating of the caulking projection by the caulking tool.

* * * * *